United States Patent [19]
Kojima et al.

[11] Patent Number: 5,246,257
[45] Date of Patent: Sep. 21, 1993

[54] SKEW PIPE COUPLING

[75] Inventors: Nobuyuki Kojima; Noboru Kaneko, both of Kumagaya, Japan

[73] Assignee: Riken Corporation, Tokyo, Japan

[21] Appl. No.: 981,374

[22] Filed: Nov. 25, 1992

[30] Foreign Application Priority Data

Nov. 28, 1991 [JP] Japan .................. 3-098245[U]

[51] Int. Cl.⁵ ............................................. F16L 17/04
[52] U.S. Cl. .................... 285/112; 285/367; 285/373
[58] Field of Search ............ 285/112, 373, 419, 420

[56] References Cited

U.S. PATENT DOCUMENTS

| | | | |
|---|---|---|---|
| 4,611,839 | 9/1986 | Rung | 285/419 X |
| 4,861,075 | 8/1989 | Pepi et al. | 285/112 |
| 4,966,395 | 10/1990 | Hendrickson | 285/112 X |

FOREIGN PATENT DOCUMENTS 2227065  7/1990  United Kingdom ................ 285/112

*Primary Examiner*—Dave W. Arola
*Attorney, Agent, or Firm*—Bachman & LaPointe

[57]  ABSTRACT

A pipe coupling is provided having a pair of arcuate housings each provided with a crescent groove and a crescent protrusion formed on an abutting end surface of the arcuate housings in the positions which is symmetrical to each other around a vertical axis and is offset from a transverse central axis. When the arcuate housings are tightened by bolts and nuts, the crescent protrusion is inserted into the crescent groove, thereby causing skewed movement of the arcuate housings around the vertical central axis of the pipe coupling in adverse directions to the predetermined angular positions. Thus, upon completion of tightening by the bolts, excessive tightening by the bolt is prevented due to mutual contact of the abutting end surfaces of the arcuate housings.

7 Claims, 6 Drawing Sheets

5,246,257

SKEW PIPE COUPLING

FIELD OF THE INVENTION

This invention relates to a pipe joint, in particular a victaulic pipe coupling capable of connecting adjacent ends of a pair of pipes for sealing.

BACKGROUND OF THE INVENTION

A victaulic pipe coupling is used to connect a pair of pipes whose ends are formed with grooves. For instance, U.S. Pat. No. 3,054,629 to Piatek issued Sep. 18, 1962 discloses a pipe coupling which comprises a pair of arcuate coupling segments attached to adjacent ends of a pair of pipes. A sealing gasket is located in the coupling segments for engagement with an external periphery at the end of pipes. Each of the coupling segments has keys on their inner periphery for engagement within the grooves formed in the adjacent pipe ends. Provided on each coupling segment are a pair of pads radially extending at opposite ends thereof and having an aperture for receiving a bolt which tightens the coupling segments. Each end of the keys is provided with a chamfer which engages with a side surface of the groove to draw the pipe ends toward each other as the chamfer is forced into the groove until a radial side surface of the key is brought into holding engagement with the side surface of the groove.

Self-adjusting pipe clamp and coupling shown by U.S. Pat. No. 4,611,839 to Rung, et. al. issued Sep. 16, 1986 comprises a pair of coupling segments each having inclined end surfaces for sliding contact to each other. These end surfaces of the coupling segments are positioned in closely proximal relationship to each other upon initial assembly of the coupling onto a pipe having an external diameter which is a maximum diameter within a range of manufacturing tolerances of the pipe.

However, prior art pipe couplings have a serious defect in that they can not fully prevent longitudinal displacement of the pipes since clearance is formed along the longitudinal axis of the pipes between the key sections and side walls of the grooves formed on the pipes. Also, additional defect is in that excessive tightening force loaded on the coupling by bolt causes damage to the pipes and resilient gasket located between the pipe coupling and outer periphery of the pipe.

It is therefore an object of the present invention to provide a skew pipe coupling capable of preventing longitudinal displacement of the pipes without damage to the pipes and a gasket positioned between arcuate housings and outer periphery of the pipe in firmly securing adjacent pipe ends.

Another object of the present invention is to provide a skew pipe coupling easily assembled for strong joint of pipe ends.

Still another object of the present invention is to provide a skew pipe coupling which has a novel structure wherein a pair of arcuate housings may be skewed in opposite directions by a slight angle around a vertical central axis in order to accomplish firm connection of the pipe ends and prevent axial displacement of the pipe ends without any damage to the pipes and gasket.

A further object of the present invention is to provide a pipe coupling in which a pair of arcuate housings may be skewed around a vertical axis to provide skewed arrangement of each key section in the annular groove of the pipe end.

SUMMARY OF THE INVENTION

The pipe coupling of the present invention includes a pair of arcuate housings of substantially identical configuration and clamping means for securing the arcuate housings. Each of the arcuate housings has bolt pads at the opposite ends and key sections formed along transverse edges of the arcuate housing. Each of the key sections is engageable with an annular groove formed on an outer circumferential surface of a pipe end. Guide means is formed on each abutting surface of the arcuate housings and provides a cylindrical surface to slightly rotate the arcuate housings around the vertical central axis in adverse directions when the bolt is tightened with a nut. In other words, transverse central axes of the arcuate housings are slightly skewed relative to a plane perpendicular to a longitudinal central axis of the arcuate housings so that each key section is positioned in an inclined condition in the annular groove of the pipe end for skewed attachment of the arcuate housings. The clamping means comprises a bolt and a nut to tighten each of the bolt pads. The bolt is inserted into an aperture formed at each bolt pad in the position offset from the transverse central axis of the arcuate housing. The aperture is formed at each bolt pad in a position offset from the transverse central axis for receiving the bolt inserted therein.

The guide means comprises a protrusion and a groove each formed on an abutting surface of the arcuate housing in a position offset from the transverse central axis and symmetrical relative to the vertical central axis. The guide means provides a cylindrical surface to rotate the arcuate housings around the vertical central axis in adverse directions when the bolt is tightened with a nut. The guide means comprises a protrusion and a groove each formed in a position offset from the transverse central axis and symmetrical relative to the vertical central axis.

The crescent or semicircular groove receives the protrusion for cylindrical surface contact to cause relative skew movement of the arcuate housings. The protrusion is crescent or semicircular and has a cylindrical surface engageable with a cylindrical surface of the groove.

Tightening of the bolt permits slight skewed movement of the transverse central axes of the arcuate housings to an angular position up to 30 degrees relative to a plane perpendicular to a longitudinal central axis of the arcuate housings. Transverse central axes of the arcuate housings are slightly skewed relative to a plane perpendicular to a longitudinal central axis of the arcuate housings and thereby each key section is positioned in an inclined condition in the annular groove of the pipe end. The inner edge of the key section is brought into contact with an outer edge of the pipe groove, and an outer edge of the key section is brought into contact with an inner edge of the pipe groove to prevent longitudinal and radial displacement of the pipe.

Specifically, the inner edge of one end of the key section is in contact with an outer edge of the annular groove. The outer edge of one end of the key section is away from an inner edge of the annular groove. At the other end of the key section, the outer edge of the key section is brought into contact with the inner edge of the annular groove, and the inner edge of the key section is away from the outer edge of the annular groove. Thus, clearance between the key section and the annular groove is eliminated. The key section serves to prevent longitudinal and radial displacement of the pipe ends without applying any excessive force to the pipe ends and gasket.

In use, a gasket is attached to two opposite and aligned pipe ends and the arcuate housings are positioned on the gasket. When each bolt is tightened, the arcuate housings are moved toward each other and at the same time rotated around the vertical central axis in adverse directions relative to each other by the guide means. The key section is engaged with the corresponding annular groove of the pipe end for rotation so that the inner edge of the key section is brought into contact with an outer edge of the annular groove and the outer edge of the key section is brought into contact with the inner edge of the annular groove to prevent longitudinal and radial displacement of the pipe without applying any excessive force to the gasket. Thus, the pipe coupling firmly connects two pipe ends for sealing as the gasket is kept in a condition forcibly attached on the outer surface of the pipe end, and any part of the gasket is prevented from extruding out of the housing by engagement of the key section and annular groove of the pipe end. Excessive tightening by the bolt is prevented due to mutual contact of the end surfaces of the arcuate housings.

DETAILED DESCRIPTION OF THE EMBODIMENT

Figure 1:
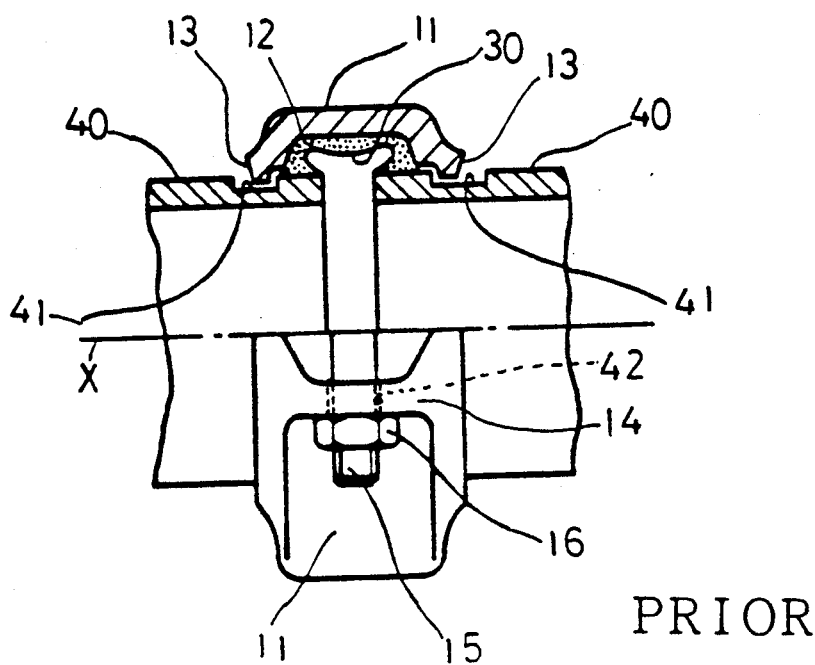
FIG. 1 is a section view of a prior art pipe coupling taken along a longitudinal axis of the pipe coupling.
Figure 2:
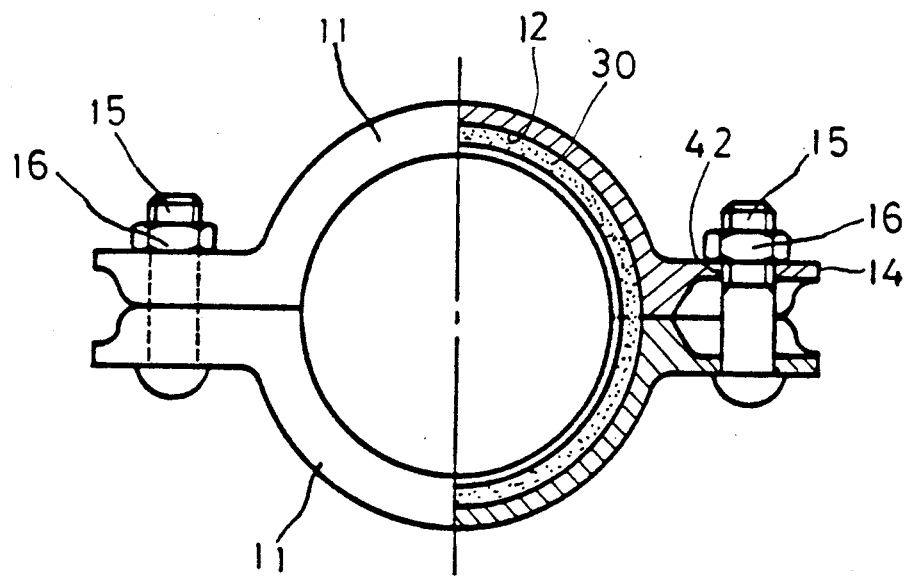
FIG. 2 is a section view of the prior art pipe coupling taken along a transverse axis of the pipe coupling.

Referring now to FIGS. 1 to 4 a typical prior art pipe coupling of victaulic type has a pair of arcuate housings 11 of substantially identical configuration and made of cast iron. Each arcuate housing 11 is formed with an arcuate body 12 to receive a rubber gasket 30 (FIG. 2), a pair of bolt pads 14 transversely extend from both ends of the arcuate body 12 and a pair of key sections 13 are formed along transverse edges of the arcuate body 12 between the bolt pads 14 in spaced and substantially parallel relation to each other.

Each of the key sections 13 may be engaged with an annular groove 41 formed on an outer circumferential surface of each of adjacent pipe ends 40. An elastic gasket 30 is positioned between the arcuate housings 11 and each outer periphery of the pipe ends 40 to seal fluid passing through the pipe coupling. Formed in each bolt pad 14 is an aperture 42 through which a bolt 15 is inserted to tighten the pipe couplings by the bolt 16 and a nut 16 which function as clamping means for securing the arcuate housings.

Figure 3:
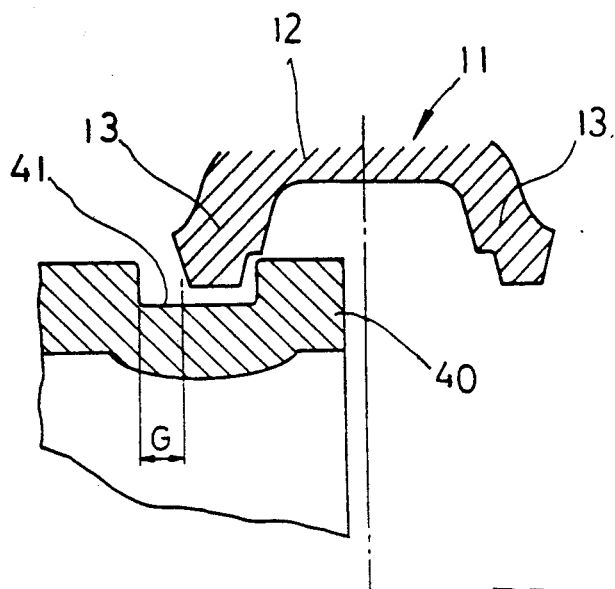
FIG. 3 is an enlarged section indicating key sections of the arcuate housing engaged with an annular groove of the pipe end.

As understood from FIG. 3, the width of the key section 13 is designed to be narrower than the width of the annular groove 41 in order to provide a gap or clearance G which may facilitate assembly of the pipe coupling for loose engagement of the key section 13 with the annular groove 41.

However, if the distance of the clearance G is too long, the pipe may disadvantageously be displaced or moved along its longitudinal axis X due to large pressure variation within the pipes or some external force applied thereto. In same cases, the pressure variation within the pipes or external force causes rotative movement of the pipe ends, thereby resulting in offset arrangement or deformation of the pipe ends and reduced sealing performance of the pipe coupling.

Figure 4:
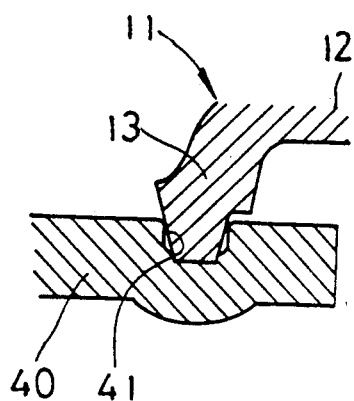
FIG. 4 is an enlarged section of another type.

On the other hand, pipe couplings of another type structure have been developed as shown in FIG. 4 wherein key sections 13 are tightly inserted within corresponding annular grooves 41 without clearance in order to prevent displacement or deformation of pipe end 40. The pipe coupling of this type, however, is disadvantageous in its difficult assembly due to tolerance in manufacturing the pipe coupling without clearance between the key section 13 and the annular groove 41.

FIGS. 5 to 10 indicate the pipe couplings of the present invention wherein same reference numerals are used for parts similar to those shown in FIGS. 1 to 4, and description on these similar parts is omitted.

Figure 7:
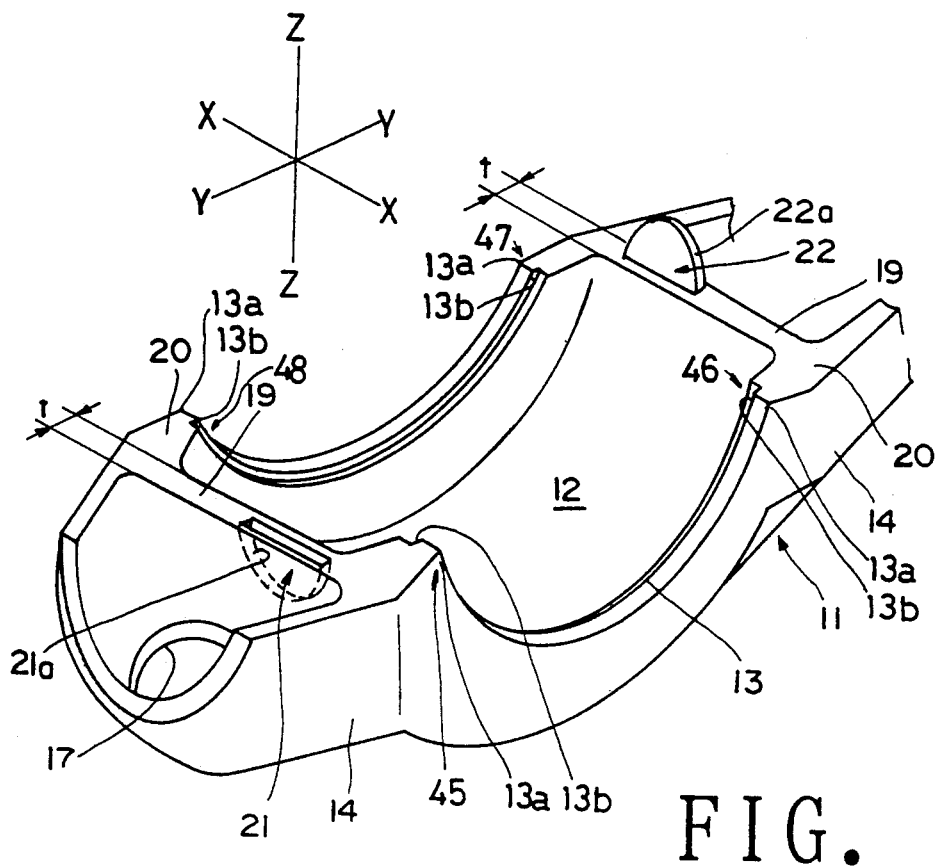
FIG. 7 is a perspective view of an arcuate housing used in the pipe coupling according to the present invention.

As shown in FIG. 7, the skew pipe coupling 10 of the present invention includes guide means 18 formed on an end surface 19. The arcuate body 12 is formed with an abutting surface 20 which includes the end surface 19 flush with the abutting surface 20. Contact of the opposed abutting surfaces 20 of the arcuate housings 11 provides a limited minimum diameter of a hole into which the pipe ends 40 are inserted. In the embodiment shown in FIG. 7, the guide means 18 comprises a crescent groove 21 and a crescent protrusion 22 formed on the end surfaces 19. As understood from FIG. 8, the crescent groove 21 and crescent protrusion 22 are formed in the positions symmetrical around the center O to each other and offset by 1 from the transverse central axis Y. The crescent groove 21 has its cylindrical surface 21a for the guide means 18. The crescent protrusion 22 has its cylindrical surface 22a for the guide means 18 to slightly rotate the arcuate housings 11 by 3 degrees around the vertical central axis Y in adverse directions when the bolt 15 is tightened with the nut 16. Either of the crescent groove 21 and crescent protrusion 22 has its rectangular section and width less than width t of the end surface 19. Alternatively, either of the crescent groove 21 and crescent protrusion 22 may be formed in arcuate section having their curvature around the center O as shown in FIG. 10.

Similarly to the crescent groove 21 and crescent protrusion 22, apertures 42 are formed in the bolt pads 14 in the positions symmetrical to each other around a center O and offset by 1 from a transverse central axis Y. The crescent groove 21 and crescent protrusion 22 are respectively aligned with the adjoining apertures 42.

Figure 10:
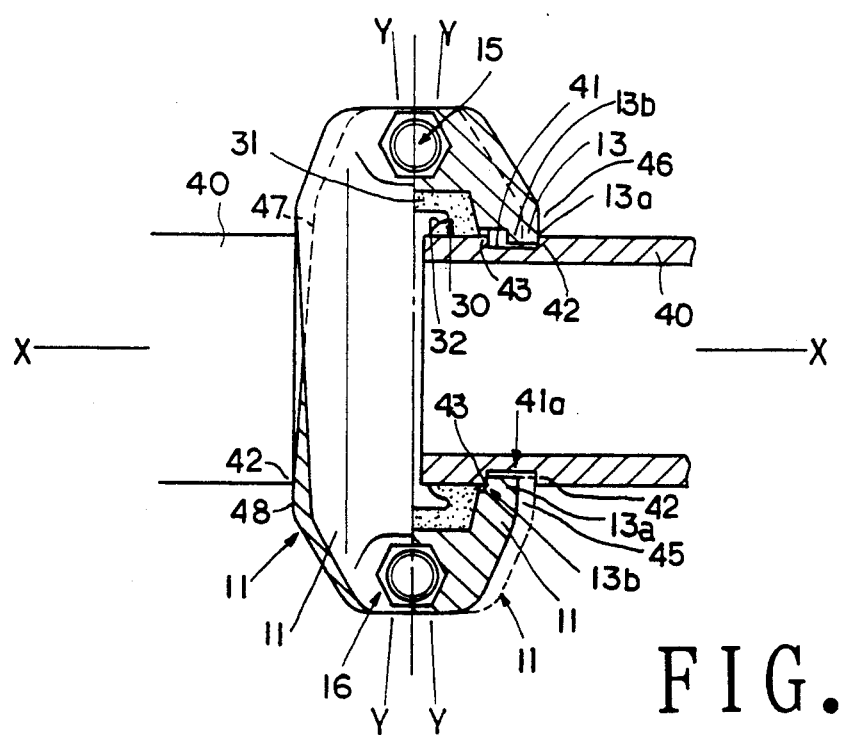
FIG. 10 is a plan view of the pipe coupling according to the present invention partly shown in section.
Figure 8:
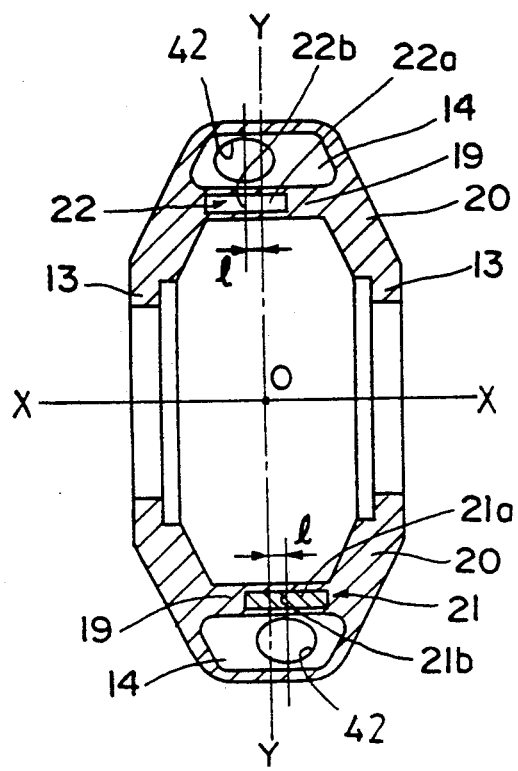
FIG. 8 is a plan view of the arcuate housing.
Figure 9:
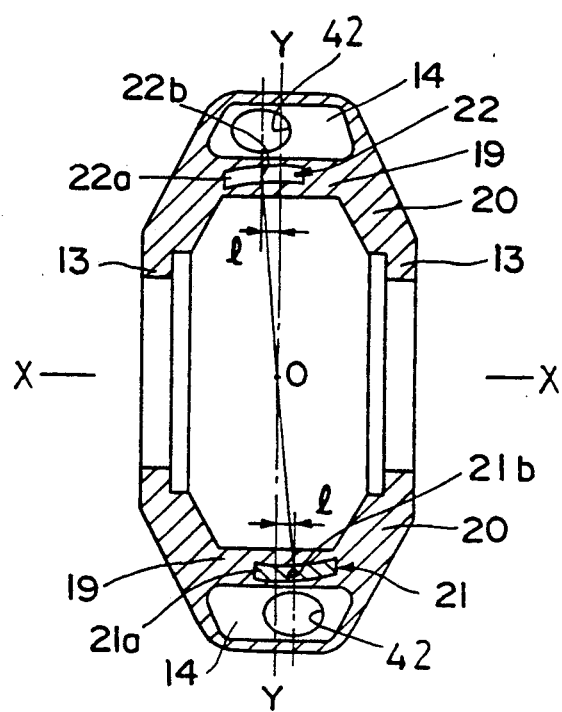
FIG. 9 is a plan view indicating another embodiment of the arcuate housing.

As is obvious from FIG. 10, width of the key section 13 is greater than width of the annular groove 41 to provide given clearance G similarly to FIG. 3. The key section 13 is engaged with the annular groove 41 with appropriate clearance G for easy attachment of the key section 13 within the annular groove 41 and for easy assembly of the pipe coupling.

Figure 6:
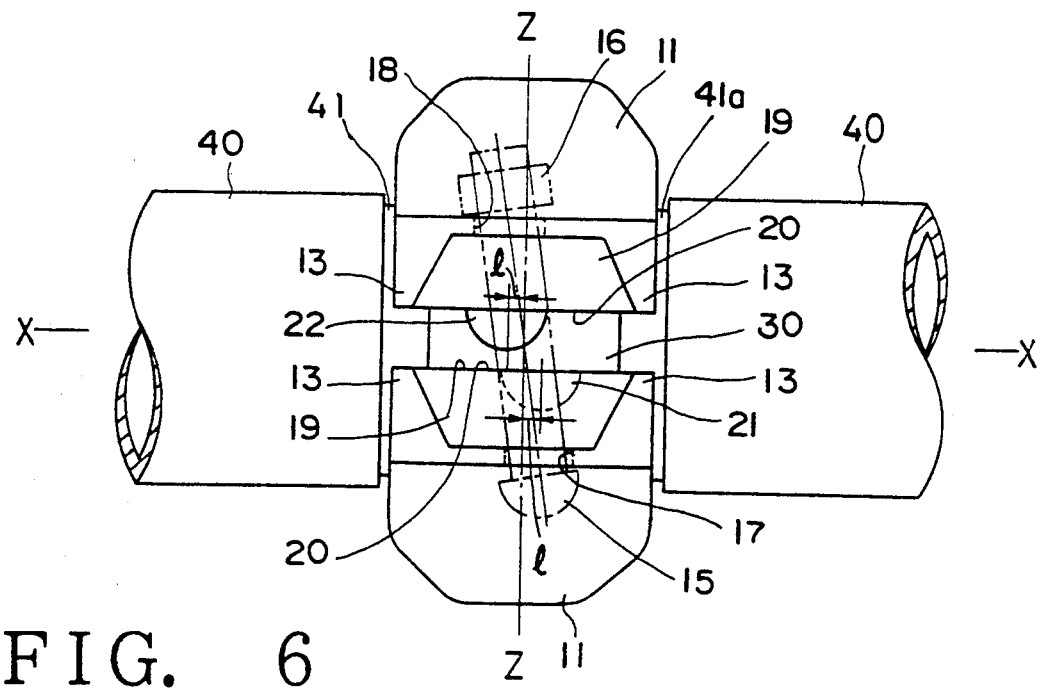
FIG. 6 is a side view of the skew pipe coupling in loosed condition.

When the pipe coupling of the present invention is attached to pipe ends 40, the gasket 30 is attached to two opposite and aligned pipe ends 40 and the arcuate housings 11 are applied on the gasket 30 as shown in FIG. 6 wherein the loosed bolt 15 is positioned within the aperture 42 in the inclined condition. In this case, the arcuate housings 11 are positioned in alignment so that both transverse central axes Y of the arcuate housings 11 are substantially parallel to a plane perpendicular to the longitudinal central axis X of the arcuate housings 11, but the crescent groove 21 and protrusion 22 to be engaged are in offset condition as shown in FIG. 6. When each bolt 15 is tightened, the arcuate housings 11 are moved toward each other and at the same time slightly rotated around the vertical central axis Z in adverse directions relative to each other to an angular position by approximately 3 degrees as the crescent protrusion 22 of the guide means 18 is inserted into the crescent groove 21 with sliding contact of the cylindrical surfaces 21a and 22a. In addition, the tightening of the bolt 15 is limited due to mutual contact of the end surfaces 19 of the arcuate housing 11 preventing excessive tightening of the bolt 15. This means that under the tightened condition, the transverse central axes Y of the arcuate housings 11 are skewed to the inclined conditions by approximately 3 degrees relative to a plane perpendicular to the longitudinal central axis X of the arcuate housings 11 as shown in FIG. 10. Similarly, the key section 13 is rotated around the vertical central axis Z within the corresponding annular groove 41a of the pipe end 40 so that as illustrated in FIG. 10, the inner edge 13b at each side 45 and 47 of the key section 13 is brought into contact with an outer edge 43 of the annular groove 41. Adversely, the outer edge 13a at each side 45 and 47 of the key section 13 is away from an inner edge 44 of the annular groove 41. At each side 46, 48 the outer edge 13a of the key section 13 is brought into contact with the inner edge 44 of the annular groove 41 and adversely, the inner edge 13b of the key section 13 is away from the outer edge 43 of the annular groove 41. As the inner and outer edges 13b and 13a of the key section 13 at both ends thereof are in contact with inner and outer edges 43 and 42 eliminating clearance G between the key section 13 and the annular groove 41, the key section 13 serves to prevent longitudinal and radial displacement of the pipe ends 40 without applying any excessive force to the pipe ends 40 and gasket 30.

Figure 5:
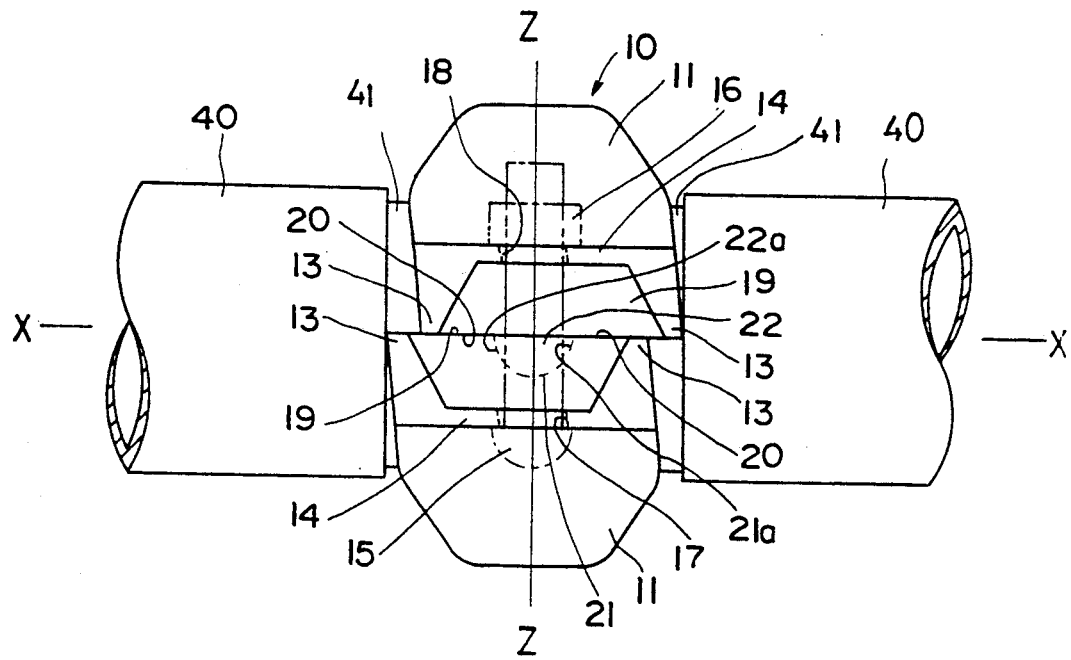
FIG. 5 is a side view of the skew pipe coupling according to the present invention.

Thus, as indicated by FIG. 5, the pipe coupling of the present invention realizes the firm connection of two pipe ends 40 for sealing by the bolt 15 which, when tightened, changes its attitude from its slant to vertical condition parallel to the vertical central axis Z, while the gasket 30 is kept in a condition firmly forced on the outer surface of the pipe end 40 and any part of the gasket 30 is prevented from extruding out of the housing 11 by engagement of the key section 13 and annular groove 41 of the pipe end 40. Gasket body 31 is positioned within the housing 11 (FIG. 10) and annular lip 32 of the gasket 30 is attached to the outer surface of the pipe end 40 for sealing.

It will be appreciated that modifications may be made to the foregoing embodiment of the present invention.

Figure 11:
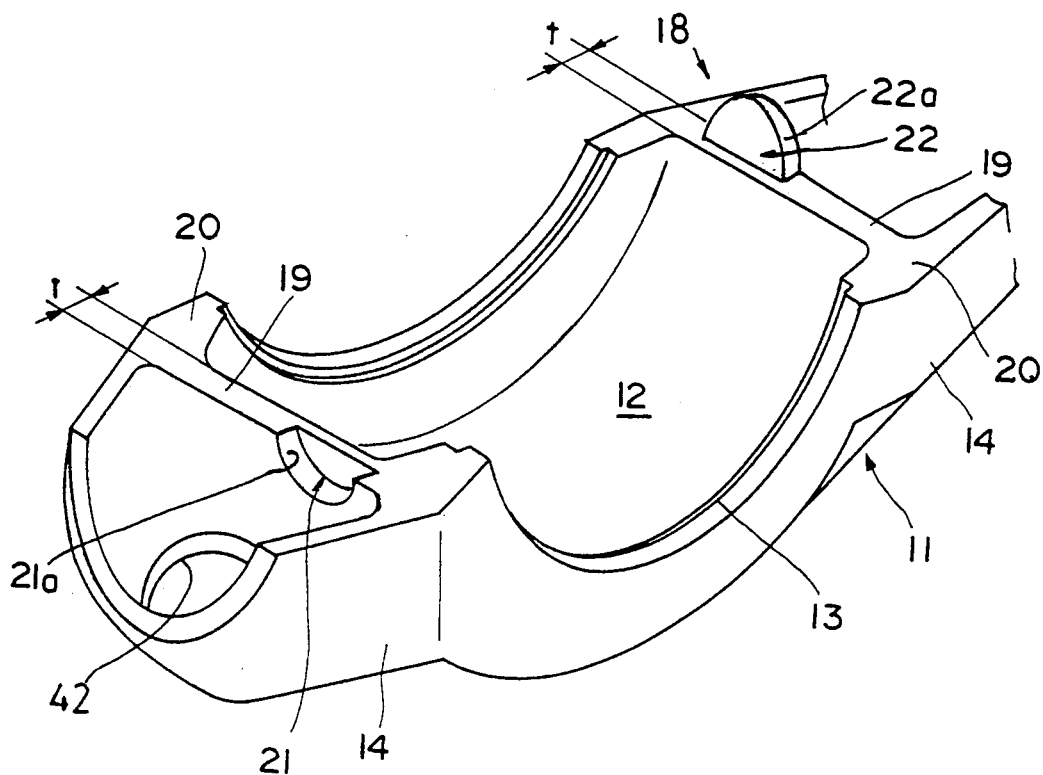
FIG. 11 illustrates the crescent groove and crescent protrusion formed in the different positions.

As illustrated in FIG. 11, the groove 21 and protrusion 22 may be formed in the different position along the transverse central axis Y, for example in proximity of outer or inner edge of the end surface 19.

As mentioned above, the skew pipe coupling of the present invention realizes the firm coupling of the pipe ends for sealing and easy assembly thereof without damage to the pipe ends and gasket.

What is claimed is:

1. In a pipe coupling which includes a pair of metallic arcuate housings of substantially identical configuration and a bolt and a nut for securing said arcuate housings, each of said arcuate housings having bolt pads at the opposite ends and key sections formed along transverse edges of the arcuate housing, each of said key sections engageable with an annular groove formed on an outer circumferential surface of a pipe end, the improvement comprising:
   an aperture formed at each bolt pad in a position offset from said transverse central axis of the arcuate housing for receiving said bolt inserted therein;
   a protrusion and a groove each integrally formed on an abutting surface of said arcuate housing in a position offset from said transverse central axis and symmetrical relative to said vertical central axis;
   a cylindrical surface formed on said protrusion; and
   a mating cylindrical surface formed on said groove;
   said groove receiving said protrusion upon tightening of said bolt and nut for rotating said arcuate housings in adverse directions around a vertical central axis for skewed attachment of said arcuate housing on a pair of pipe ends.

2. The pipe coupling of claim 1 wherein said protrusion and groove are formed on end surfaces of said arcuate housings.

3. The pipe coupling of claim 2 wherein said protrusion and groove are formed in proximity of outer or inner edge of said end surface.

4. The pipe coupling of claim 1 wherein said protrusion and groove are formed in arcuate section having the curvature around the center of the transverse central axis.

5. The pipe coupling of claim 1 wherein said transverse central axis is skewed upon tightening of said bolt and nut up to 30 degrees relative to a plane perpendicular to a longitudinal central axis of said pipe.

6. The pipe coupling of claim 1 wherein said inner edge of said key section being in contact with an outer edge of the pipe groove, and outer edge of said key section being in contact with an inner edge of the pipe groove to present longitudinal and radial displacement of the pipe.

7. The pipe coupling of claim 6 wherein the inner edge of one end of the key section is in contact with an outer edge of the annular groove; the outer edge of one end of the key section is away from an inner edge of the annular groove; at the other end of the key section, the outer edge of the key section is brought into contact with the inner edge of the annular groove; the inner edge of the key section is away from the outer edge of the annular groove; thereby eliminating clearance between the key section and the annular groove, the key section serves to prevent longitudinal and radial displacement of the pipe ends without applying any excessive force to the pipe end and gasket.

* * * * *